United States Patent [19]

Brekkestran et al.

[11] Patent Number: 5,305,215
[45] Date of Patent: Apr. 19, 1994

[54] EXPANDABLE, MOBILE, MODULAR MICROCOMPUTER SYSTEM FOR AN OFF-ROAD VEHICLE

[75] Inventors: Kevin L. Brekkestran, Fargo; Barry D. Batcheller, West Fargo; Adrian G. Kallis; Charles D. Needham, both of Fargo, all of N. Dak.

[73] Assignee: Phoenix International Corporation, Fargo, N. Dak.

[21] Appl. No.: 700,629

[22] Filed: May 15, 1991

[51] Int. Cl.$^5$ ............... G06F 15/20; B60K 41/18
[52] U.S. Cl. ............... 364/424.1; 364/424.03; 74/866
[58] Field of Search ........... 364/424.1, 424.03, 424.04; 74/866, 869, 335; 318/809; 395/275

[56] References Cited

U.S. PATENT DOCUMENTS

| | | | |
|---|---|---|---|
| 3,805,640 | 4/1974 | Schneider et al. | 74/645 |
| 4,015,488 | 4/1977 | Akeson et al. | 74/866 |
| 4,414,863 | 11/1983 | Heino | 74/866 |
| 4,425,620 | 1/1984 | Batcheller et al. | 364/424.01 |
| 4,458,471 | 7/1984 | Herwig | 56/10.2 |
| 4,569,255 | 2/1986 | Holmes | 74/866 |
| 4,625,331 | 11/1986 | Richardson et al. | 455/35 |
| 4,648,040 | 3/1987 | Cornell et al. | 364/424.01 |
| 4,648,290 | 3/1987 | Dunkley et al. | 74/866 |
| 4,703,428 | 10/1987 | Hosaka et al. | 364/424.01 |
| 4,715,012 | 12/1987 | Mueller, Jr. | 364/900 |
| 4,718,307 | 1/1988 | Yabe et al. | 74/866 |
| 4,740,898 | 4/1988 | McKee et al. | 364/426 |
| 4,794,548 | 12/1988 | Lynch et al. | 364/424.04 |
| 4,836,054 | 6/1989 | Kumura | 74/866 |
| 4,841,815 | 6/1989 | Takahashi | 74/866 |
| 4,843,902 | 7/1989 | Patton et al. | 74/335 |
| 4,855,913 | 8/1989 | Brekkestran et al. | 364/424.1 |
| 4,919,012 | 4/1990 | Bolz | 74/866 |
| 4,937,750 | 6/1990 | Gilliam | 364/424.1 |
| 4,947,454 | 8/1990 | Garner | 455/84 |
| 4,967,385 | 10/1990 | Brekkestran et al. | 464/571.03 |
| 4,998,200 | 3/1991 | Glowczeswski et al. | 364/424.1 |
| 5,001,944 | 3/1991 | Ogawa et al. | 74/866 |
| 5,007,299 | 4/1991 | Bulgrien | 74/335 |
| 5,038,091 | 8/1991 | Bashark | 318/809 |
| 5,043,892 | 8/1991 | Brekkestran et al. | 364/424.1 |
| 5,058,205 | 10/1991 | Roehrs et al. | 455/35 |
| 5,113,498 | 5/1992 | Evan et al. | 395/275 |
| 5,210,854 | 5/1993 | Beaverton et al. | 395/500 |

OTHER PUBLICATIONS

SAE Publication Nos.: 670,724; 800,675; 831,776; 850,174; 851,115; 871,665; 881,179; 901,592; 911,831.

*Primary Examiner*—Thomas G. Black
*Assistant Examiner*—Tan Q. Nguyen

[57] ABSTRACT

An expandable, modular microcomputer system for an off-road vehicle having a controller which is operable to generate a plurality of independent pulse-width modulated control signals and a plurality of independent on/off control signals to a corresponding plurality of metal oxide silicone field effect transistors (MOSFETS). An RS-485 bi-directional serial communications interface enables the system to communicate with at least one other ingredient, external, controller. Thus, the control system can be modularly expanded to handle the needs of increasingly complex powershift transmissions. A watchdog circuit monitors operation of the controller and is supplied with a regulated voltage independent of the regulated voltage used to power the microcomputer. The watchdog can provide a reset signal to the microcomputer when spurious operation of the microcomputer is detected, as well as initiate operation of a back-up voltage supply circuit. The back-up voltage supply circuit is responsive to at least one analog input and operable to pulse-width modulate at least one of the MOSFETs to thereby control a clutch of a powershift transmission while operating in a "limp-home" mode. The system is particularly well-suited for controlling transmissions of heavy-duty off-road vehicles such as earth moving and other like vehicles, but can be readily adapted for use with transmissions of vehicles to be used to widely varying applications.

10 Claims, 8 Drawing Sheets

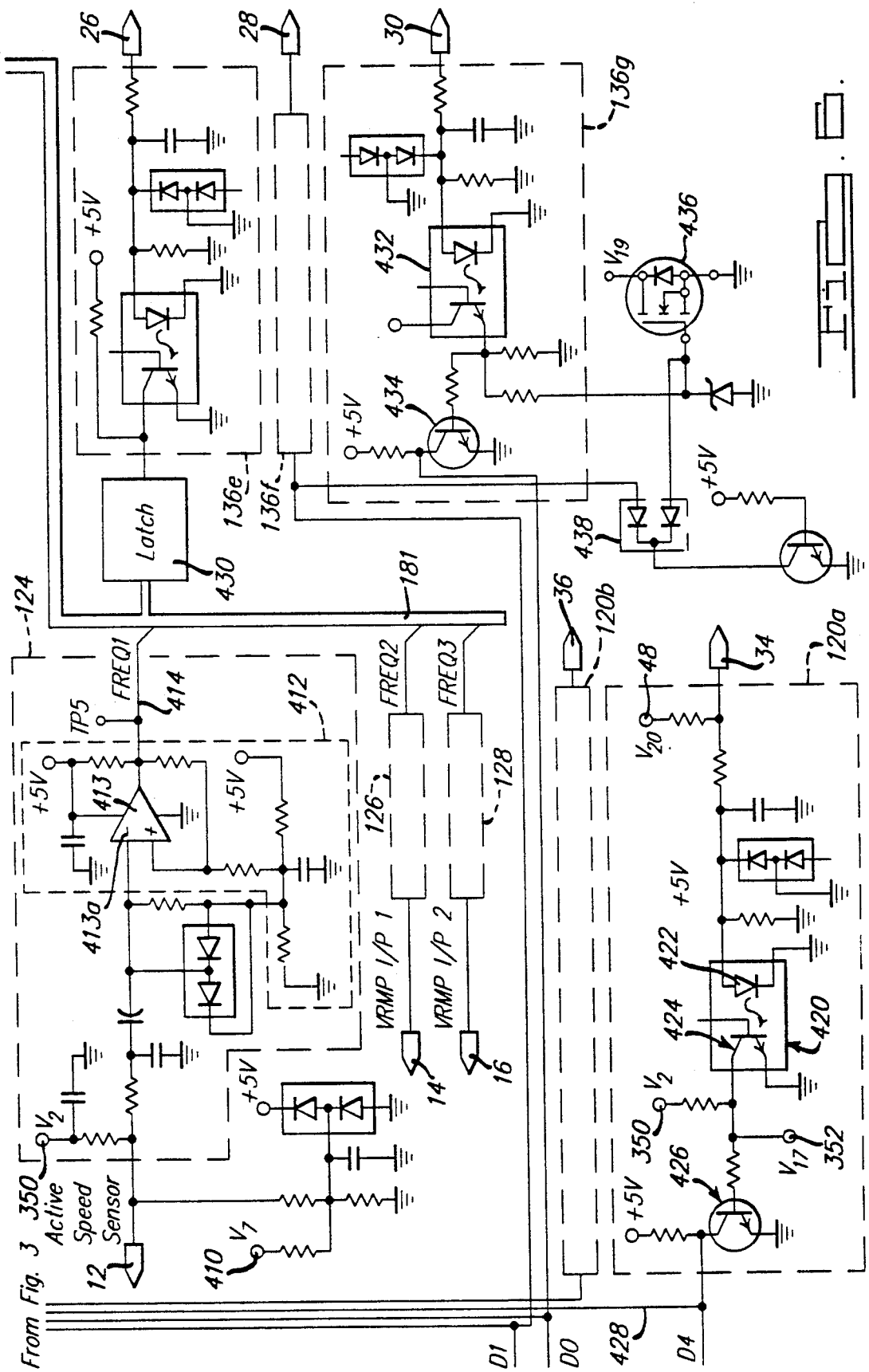

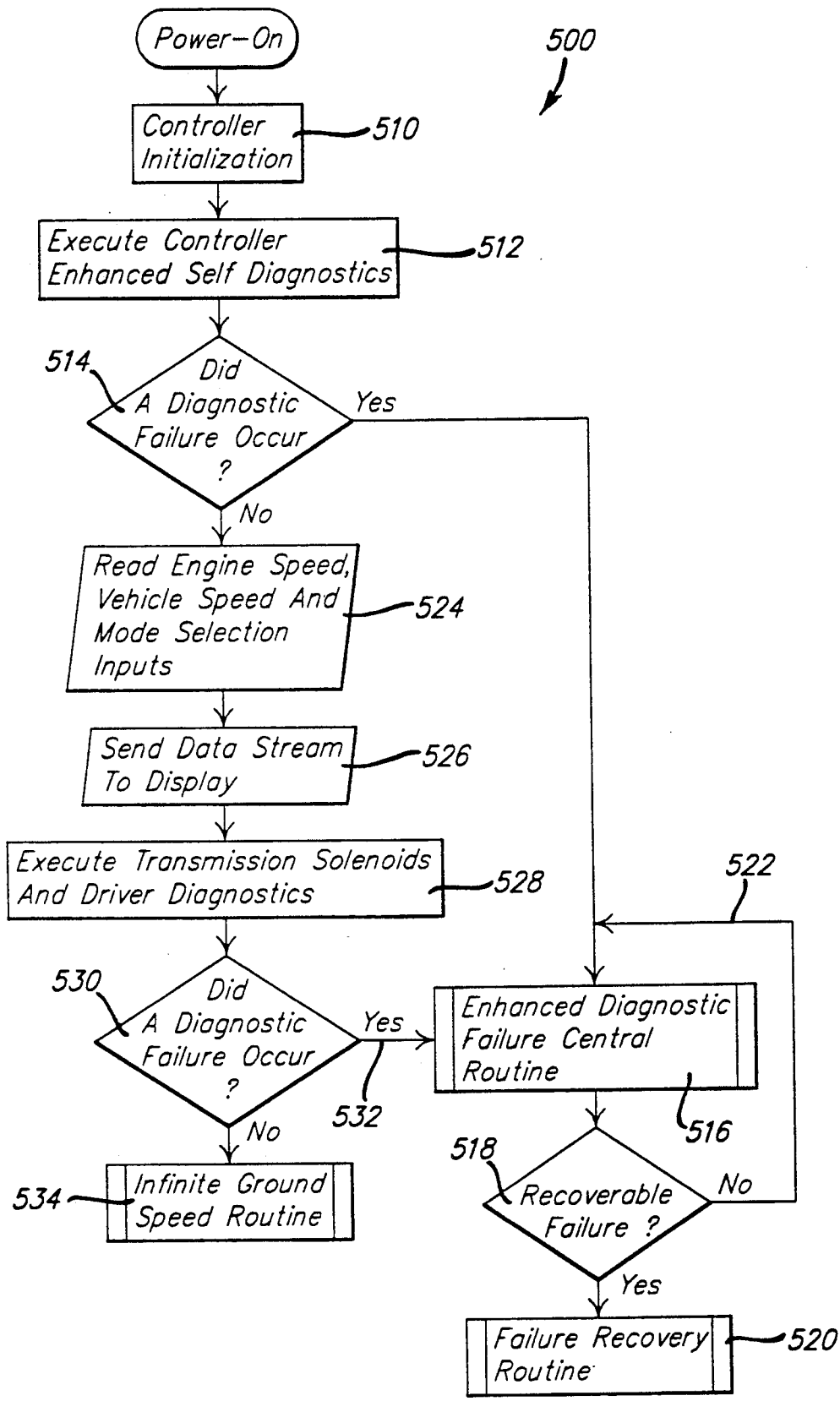

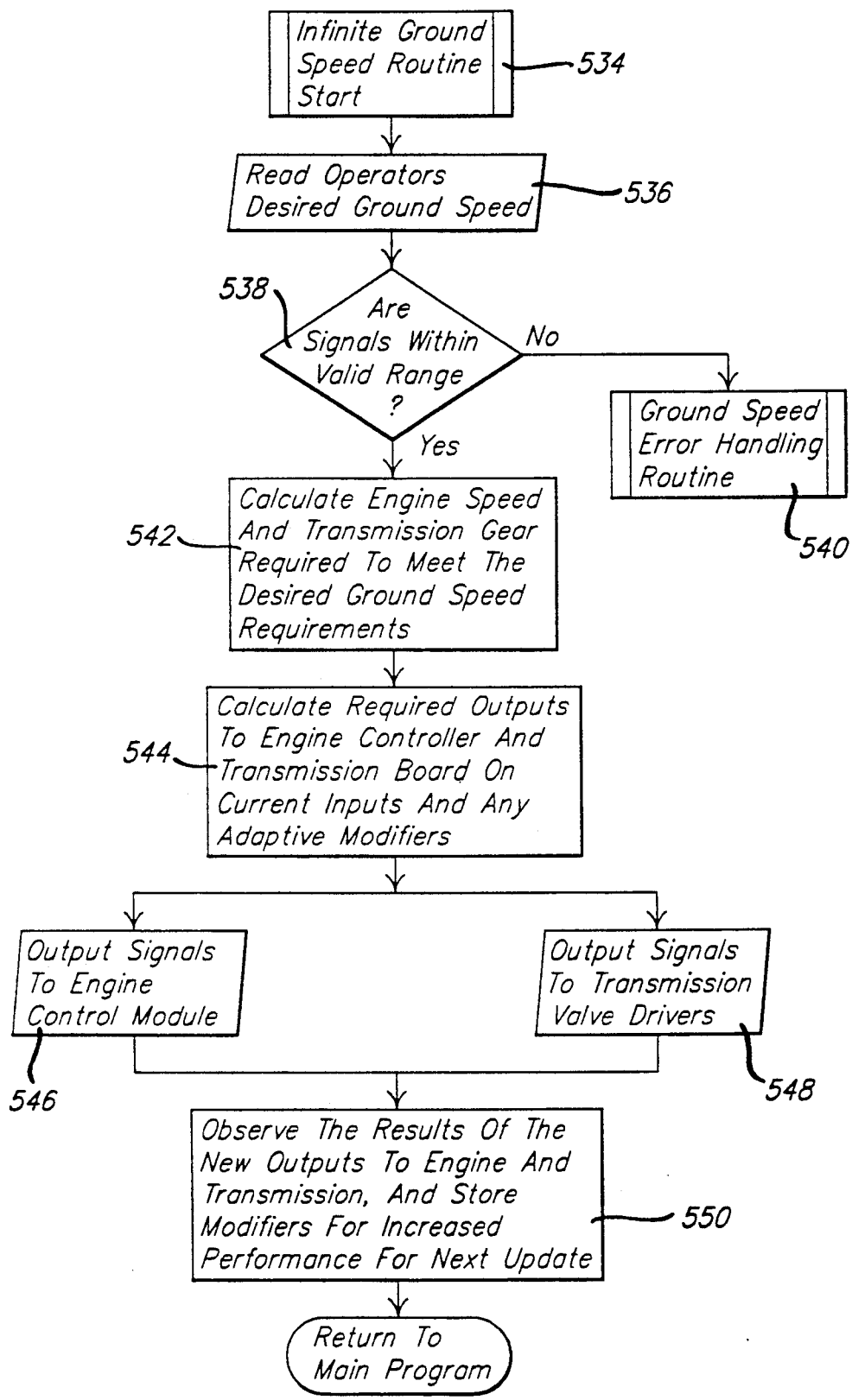

EXPANDABLE, MOBILE, MODULAR MICROCOMPUTER SYSTEM FOR AN OFF-ROAD VEHICLE

BACKGROUND OF THE INVENTION

1. Technical Field

This invention relates generally to electronic control systems, and more particularly to an electronic control system adapted to help control the various functions of a powershift transmission of a heavy-duty, off-road vehicle such as an earth moving vehicle, and to provide pulse-width modulated control of the clutch of the transmission of the vehicle.

2. Discussion

Electronic control systems have been used to help control various functions of powershift transmission systems of off-road vehicles such as heavy-duty earth moving equipment. More specifically, such systems are adapted to read and respond to various solenoids and switches which have outputs indicative of a wide variety of operating parameters such as vehicle speed, vehicle load, etc. Most particularly, such electronic control systems are helpful for providing smoother clutch engagement of a transmission in large off-road vehicles such as earth moving vehicles, where the need for smooth clutch engagement becomes particularly acute. Abrupt engagement of the clutch of such a large and heavy vehicle can contribute significantly to premature clutch wear and even damage to drive-line components of the vehicle.

Many of the problems in controlling transmissions of heavy duty off-road vehicles are discussed in U.S. Pat. No. 4,855,913, entitled "Electronic Control System For Powershift Transmission", to Brekkestran, et al., issued Aug. 8, 1989, the disclosure of which is hereby incorporated by reference. The electronic control system disclosed in this patent represents a significant step forward in overcoming several problems associated with many prior art control systems for powershift transmissions. One such problem was that of providing some means by which the transmission of an off-road vehicle could be controlled to enable the vehicle to be driven in a limited or auxiliary manner even though the controller of the system has malfunctioned. The "limp-home" mode of operation disclosed in the '913 patent provided the ability to at least move the vehicle under its own power to a trailer or a repair facility whereby the vehicle could be repaired or transported to a repair facility.

While the limp-home mode of operation provided by the control system of the '913 patent has proven to be a significant advantage in enabling heavy-duty off-road vehicles to be driven even in the presence of a malfunction of the controller of the system, this system did not provide for any type of electronically modulated control of the transmission while in the limp-home mode. Accordingly, the problems associated with completely manual operation of such transmissions are present while in the limp-home mode of the system of the '913 patent.

Yet another feature provided by the '913 patent was a watchdog timer which monitored operation of the control system, and particularly the microprocessor thereof, and helped to detect a malfunction of the microprocessor. While this feature has also proven to be valuable in increasing the operational integrity of the control system, the watchdog timer of the '913 patent was still powered by the same regulated supply voltage as the microprocessor of the system, and thereby not immune from operational problems when the regulated supply voltage powering the microprocessor operated spuriously. Thus, it was not certain that action taken by the watchdog timer was in fact due to spurious operation of the microprocessor or in fact spurious operation of the watchdog timer itself. In addition, the control system of the '913 patent incorporated no means for monitoring and overriding operation of the watchdog timer in the event of a low voltage condition present in its power regulating circuitry.

With the increasing complexity of powershift transmission systems and the number of variables which are desired to be monitored, there is a need to monitor and control even larger numbers of external sensing and actuating devices. This, in turn, has given rise to a need for an electronic control system for a powershift transmission which is capable of enabling several independent, computer-based control systems to be modularly intercoupled to thereby control and monitor an even greater number of sensor and actuator-type devices used with such transmissions. By including some means by which the microcomputers of independent control systems can communicate, information could be exchanged between the microcomputers of the various control systems to enable significantly increased flexibility and control capability of powershift transmission systems.

With further regard to the above, the ability to enable a microcomputer of an electronic control system for a powershift transmission to communicate with an external device would also enable the microcomputer to be reprogrammed without removing the electronic control system or any components thereof from the vehicle. This would further significantly increase the flexibility and utility of such a control system by enabling operating parameters stored within a memory of the microcomputer and/or the operational code stored in an electrically erasable momory device to be reprogrammed, for example, by a portable computer, at the site of the vehicle without even having to drive the vehicle from the areas at which it is currently operating. Thus, reprogramming could be accomplished in the field quickly, easily and with a minimum of inconvenience and disruption of the operation of the vehicle.

The ability to quickly and easily reprogram the microcomputer of such an electronic control system would further enhance the ability of the control system to more finely and accurately compensate for changing environmental conditions (i.e., unusually steep grades or uneven topography) which the vehicle may be required to negotiate during operation.

Accordingly, it is a principal object of the present invention to provide an electronic control system for a powershift transmission of a heavy-duty off-road vehicle, where the control system incorporates a limp-home mode capable of providing a modulated control signal to control a master clutch of the transmission of the vehicle.

It is another object of the present invention to provide an electronic control system for a powershift transmission of an off-road heavy-duty vehicle, where the control system incorporates a watchdog timer circuit powered independently of a regulated supply voltage used to power a microcomputer of the system to thereby further insure against spurious operation of the watchdog circuit in the event of a low-voltage condition of a regulated supply voltage powering the microcomputer of the system, to thereby increase the integrity of operation of the watchdog timer circuit.

It is still a further object of the present invention to provide an electronic control system having a back-up regulated voltage supply circuit which provides a pulse-width modulated control signal, where the control signal provides pulse-width modulated control over a master clutch of a powershift transmission of a heavy-duty off-road vehicle in the event of a malfunction of a microcomputer of the system or a low-voltage condition of a regulated microcomputer supply voltage.

It is yet another object of the present invention to provide an electronic control system for controlling a powershift transmission of a heavy-duty off-road vehicle, where the system includes means for monitoring a watchdog timer circuit thereof and overriding operation of the watchdog timer circuit upon detection of a malfunction in a regulated supply voltage circuit being used to power the watchdog timer circuit.

It is still a further object of the present invention to provide an electronic control system for a powershift transmission, where the control system is modular and can be coupled in bi-directional communication with a plurality of additional microcomputers of independent, external control systems, to thereby further increase the control capabilities of the system.

It is yet another object of the present invention to provide an electronic control system for a powershift transmission of a heavy-duty, off-road vehicle, where the system incorporates a microcomputer and/or an electrically erasable memory device which may be reprogrammed without removing it from the control system by an external programming device, to thereby enable the microcomputer to be reprogrammed while the vehicle remains at a work site.

SUMMARY OF THE INVENTION

An expandable, mobile, modular microcomputer system for an off-road vehicle is disclosed in accordance with preferred embodiments of the present invention. The computer system generally comprises a controller responsive to a plurality of current sourcing and sinking digital input signals and a plurality of current sinking analog input signals. The controller is coupled to a plurality of independent switching devices and operates to generate a first plurality of independent, pulse-width modulated control signals and a second plurality of on/off control signals. A first predetermined group of the switching devices are responsive to the pulse-width modulated control signals and generated pulse-width modulated drive signals to control a plurality of external devices such as solenoid-operated proportional actuators. A second predetermined group of the switching devices are responsive to the on/off control signals and generate a plurality of independent on/off drive signals for driving a corresponding plurality of external devices, such as on/off solenoid valves.

The system further includes a watchdog circuit which monitors controller operation and provides a reset signal to the controller when spurious operation of the controller is detected. The watchdog is further powered independently of a regulated power supply which supplies power to the controller so that a low power condition associated with a power supply of the controller does not compromise operation of the watchdog circuit. The watchdog further senses when a malfunction of the controller has occurred and initiates operation of a back-up power circuit. The back-up power circuit is responsive to a predetermined one of the inputs to enable at least one of the switching devices to provide a pulse-width modulated drive signal despite the controller malfunction.

The system further includes a bi-directional communications interface for enabling the controller of the system to communicate with other controllers or components of external devices and/or systems. Accordingly the control system of the present invention is modular and may be expanded to tailor its use to specific application requirements. The communications interface of the system further enables the controller to be reprogrammed without removing the system or any component parts thereof from an associated vehicle. Thus, the controller can be reprogrammed with specific information to tailor the operational characteristics of the system to changing environmental conditions, such as extremely hilly topography, to better enable the control system to control a powershift transmission of the vehicle.

While the invention is applicable to a wide variety of vehicles, it has particular utility when used in connection with powershift transmissions of heavy-duty off-road vehicles such as earth moving vehicles. The control system of the present invention enables significantly greater flexibility in controlling the powershift transmission of such a vehicle. The ability of the control system to enable the controller thereof to be reprogrammed in the field obviates the need to drive such a vehicle off site when operational parameters must be modified to properly compensate for environmental characteristics. The modularly expandable feature of the control system further enables significantly increased control capabilities heretofore unavailable with prior art control systems, thus enabling the control system of the present invention to control and monitor a wider variety of operational parameters of a powershift transmission. The ability to pulse-width modulate at least one of the switching devices when a controller malfunction has occurred further enables the master clutch of a powershift transmission being controlled by the control system to be pulse-width modulated to thereby enable smooth, controlled shifts. Accordingly, wear and tear on the powershift transmission itself and associated drive-line components of the vehicle, which would normally be introduced when the vehicle is driven under its own power to a repair facility, is significantly reduced.

BRIEF DESCRIPTION OF THE DRAWINGS

The various advantages of the present invention will become apparent to one skilled in the art by reading the following specification and subjoined claims and by referencing the following drawings, in which reference numerals designate like components, and where:

FIGS. 2–6 in conjunction illustrate in greater detail the various components of the control system and intercoupling of the components; and where FIG. 2 principally illustrates the first and second voltage regulators and a portion of the low-voltage reset circuitry, the three low current drivers which may be used to drive a visual display panel, an electrically erasable, programmable, read-only memory (EE- PROM), and the zener regulated power supply for the watchdog circuit;

FIG. 3 illustrates the controller of the present invention, together with a more detailed illustration of one of the current sinking digital inputs, the latch circuits intercoupled between the switching devices and the controller, and the wiper arms of two independent potentiometers coupled through a multiplexer to the controller;

FIG. 4 illustrates in greater detail the back-up voltage regulator circuit, one of the pulse-width modulated switching devices and one of the on/off switching devices;

FIG. 5 illustrates in greater detail the watchdog circuitry of the present invention, as well as the mode select and bi-directional serial interface communications circuitry;

FIG. 6 illustrates in greater detail one of the current sourcing digital inputs of the present invention, a plurality of current sinking digital inputs, and the three frequency inputs of the invention;

FIG. 7 is a flowchart of a diagnostic program executed upon power-up of the system; and FIG. 8 is a flowchart of a ground speed routine for implementing the present invention in a preferred implementation.

DETAILED DESCRIPTION OF THE PREFERRED EMBODIMENTS

Figure 1:
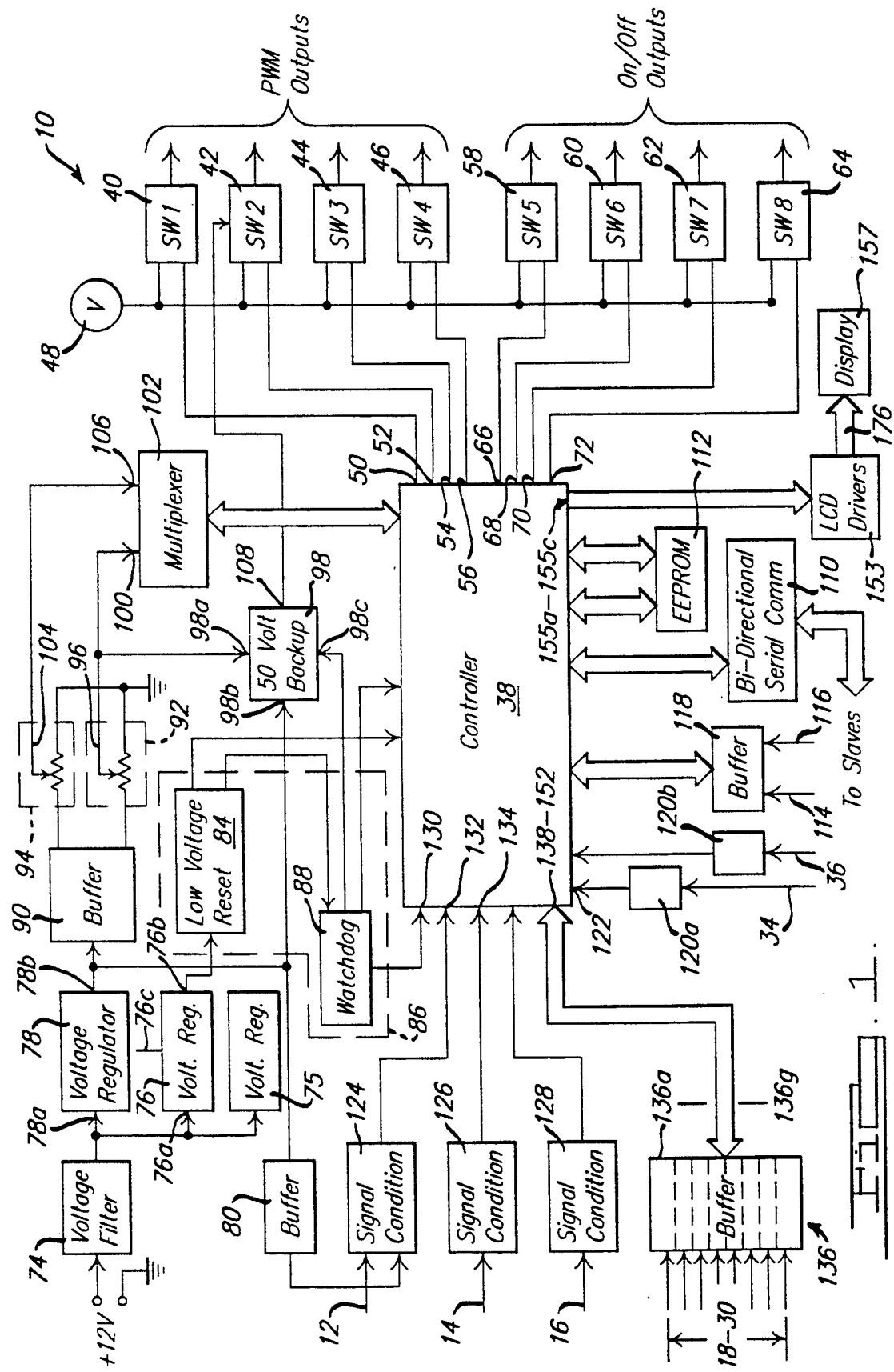
FIG. 1 is a simplified block diagram of an expandable, mobile, modular microcomputer control system for an off-road vehicle in accordance with the present invention.

Referring to FIG. 1, an expandable, mobile, modular microcomputer control system 10 for a heavy-duty, off-road vehicle is disclosed in accordance with a preferred embodiment of the present invention. The system 10 generally comprises a current sourcing digital frequency input 12; a digital frequency input 14; a variable reluctance frequency input 16; a plurality of current sinking digital inputs 18-30; current sourcing digital inputs 34 and 36; a controller 38 responsive to inputs 12-36; a first plurality of independent switching circuits 40-46 coupled independently to a +12 volt voltage source 48 and to pulse-width modulated output ports 50-56 of controller 38; and a second plurality of independent switching circuits 58-64 coupled independently with output ports 66-72 of controller 38.

The system further includes a conventional voltage filtering circuit 74 coupled to a power source such as a +12 volt battery of a vehicle with which the system 10 is being used. Voltage filter circuit 74 supplies a relatively filtered input voltage to a first voltage regulator circuit 76 having an input 76a, and an output 76b, and a adjust input (ADJ) 76c. Output 76b provides a regulated +5.0 volts for powering controller 38 and associated circuitry. A second voltage regulator 78 having an input 78a and an output 78b is included for providing a regulated +7.0 volts at output 78b to a buffer 80, which in turn acts as a current source for current sourcing digital frequency input 12 and 14. An independent, voltage regulator 75 is further included, whose function will be described momentarily.

The output 76b of first voltage regulator 76 further is coupled to a low-voltage reset circuit 84 and a watchdog timer circuit 86. Watchdog timer circuit 86 includes a watchdog timer 88 which is bi-directionally coupled with controller 38. Watchdog timer circuit 86 is independently powered by voltage regulator 75.

The output 78b of the 7.0 volt voltage regulator 78 is further input to a buffer 90 having a pair of outputs coupled to a first potentiometer 92 and a second potentiometer 94. First potentiometer 92 includes a wiper arm 96 which is coupled to an input 98a of a +5.0 volt back-up voltage supply circuit 98 and an input 100 of a multiplexer 102. The second potentiometer 94 similarly includes a wiper arm 104 which is coupled to an input 106 of the multiplexer 102. Multiplexer 102 is in turn bi-directionally coupled with controller 38.

The 5.0 volt back-up voltage supply circuit 98 is further includes an input 98b which is coupled to the output 78b of the 7.0 volt voltage regulator 78, and an input 98c coupled to the watchdog circuit 86. An output 108 of the back-up voltage supply circuit 98 is coupled to switching device 42.

Controller 38 is further bi-directionally coupled with a bi-directional serial communications interface 110 and an electrically erasable, programmable, read-only memory (EEPROM) 112. A pair of control inputs 114 and 116 are further coupled via buffers 118a and 118b to controller 38. Current sourcing digital input 36 is similarly coupled through a buffer 120b to controller 38. Current sourcing on/off input 34 is similarly input to buffer 120a, which in turn outputs a buffered signal associated with input 34 to an interrupt ($\overline{IRQ}$) port 122 of controller 38. Interrupt port 122 operates as an edge detection circuit to detect the transistions of the signal applied to input 34.

Signal conditioning circuits 124, 126 and 128 are further interposed between inputs 12, 14 and 16 respectively to condition the input signals to input ports 130, 132 and 134 of controller 38. Current sinking digital inputs 18-30 are similarly coupled through buffer 136 with a plurality of input ports 138-152 of controller 38.

Further included are a plurality of low current driver circuits 153a-153c which are coupled to output ports 155a-155c of controller 38. The drivers 153a-153c each have their outputs coupled to a display 157 for displaying various operational parameters of a powershift transmission with which the system 10 is associated.

In general operation, the controller 38 reads inputs 12-36 and generates first and second pluralities of control signals at its output ports 50-56 and 66-72 respectively. The control signals at output ports 50-56 represent pulse-width modulated control signals. The outputs at output ports 66-72 represent on/off control signals. The pulse-width modulated control signals are essentially digital signals having controllably varying duty cycles.

By varying the duty cycle of each pulse-width modulated control signal, each one of the switching circuits 40-46 can be independently modulated on/off in accordance with its associated pulse-width modulated control signal. By modulating each one of the switching circuits 40-46 on/off in accordance with the duty cycle of its associated pulse-width modulated control signal, the average voltage applied to external devices coupled to each one of the switching circuits 40-46 can be precisely controlled. When such external devices are, for example, proportionally actuated solenoid valves, the pulse-width modulated drive signals supplied by the switching circuits 40-46 can modulate the proportionally actuated solenoid valves to achieve precise, gradual control over physical elements coupled to the solenoids. Accordingly, where such a proportionally actuated solenoid valve is used in connection with a master clutch of a powershift transmission of a heavy-duty, off-road vehicle, the master clutch may be controllably modulated by the solenoid valve in accordance with a pulse-width modulated drive signal from a predetermined one of switching circuits 40-46.

Figure 2:
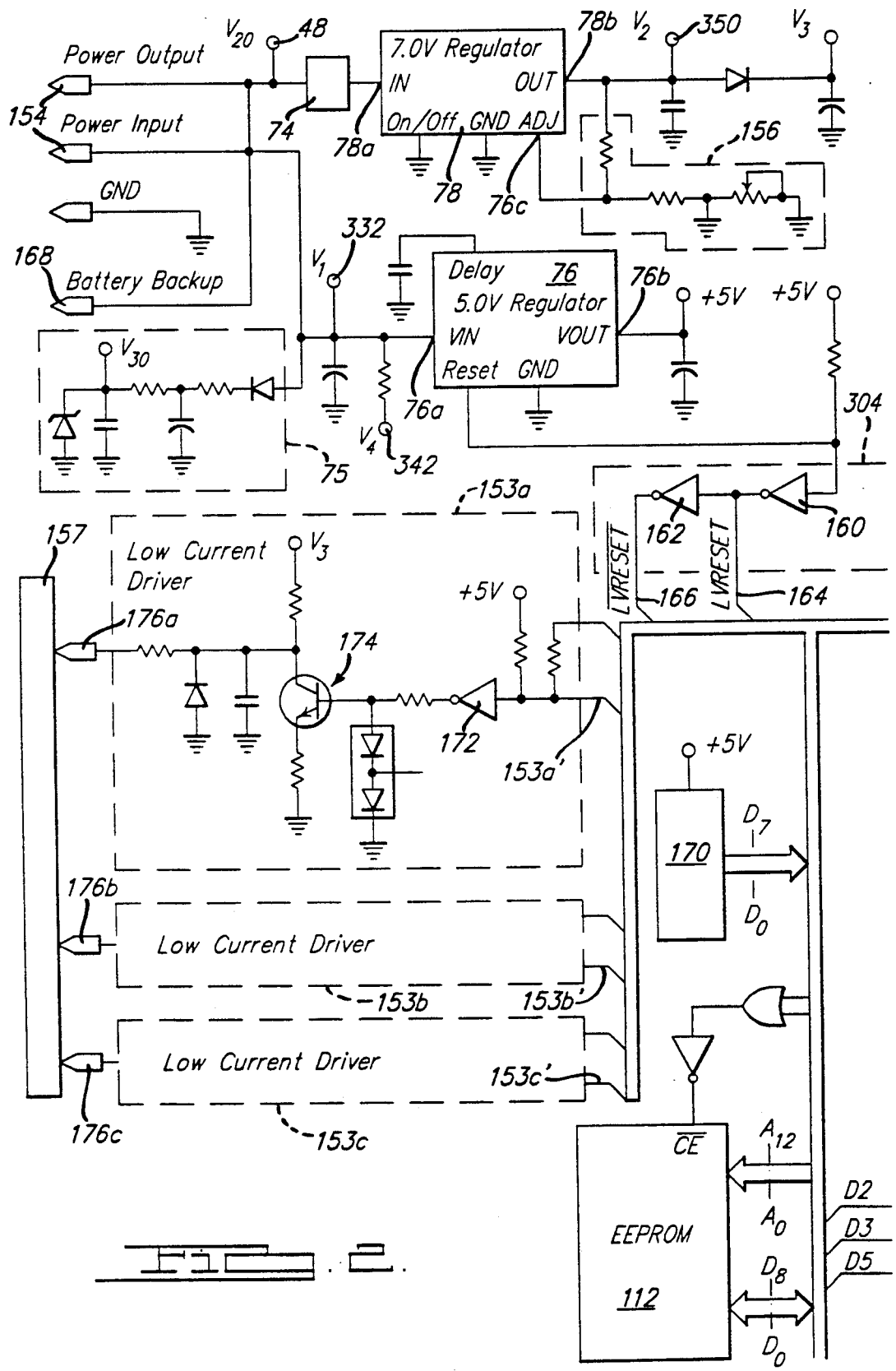

With reference to FIGS. 2-6, a more detailed schematic representation of the control system 10 of FIG. 1 is illustrated. Referring first to FIG. 2, a +12 volt supply voltage is coupled at connectors 154 to the 5.0 volt regulator 76 and the voltage filtering circuit 74. The 5.0 volt regulator 76 generates a regulated +5.0 volt output which is used to power the various components of the system 10 and to act as a "pull-up" voltage for various sub-circuits of the system 10.

The 7.0 volt regulator receives the +12 volt input voltage from filtering circuit 74 and generates a regulated 7.0 volt output 78b, which is represented by $V_2$. The output 78b of voltage regulator 78 is further precisely adjustable via a potentiometer/voltage divider circuit 156.

The 5.0 volt regulator 76 further includes reset output 76c is coupled to a first inverting amplifier 160 and a second inverting amplifier 162. The first inverting amplifier 160 generates a logic 1 level low voltage reset signal at line 164 while the second inverting amplifier 162 generates a logic 0 level low-voltage reset signal on line 166. The reset signals on lines 164 and 166 operate in connection with the low voltage reset circuit 84 of the watchdog circuit 86 to reset the controller 38 when spurious operation of the controller 38 is detected, and also to hold the watchdog timer 88 clear when a low-voltage condition occurs (i.e., when the output voltage of regulator 76 drops below a predetermined level). This aspect of the present invention will be discussed further in connection with the watchdog circuit 86.

As also illustrated in FIG. 2, an optional battery back-up input 168 is included for enabling an auxiliary battery to be operationally coupled to the system 10. Thus, if an optional battery is included and power is lost from the main +12 volt power supply, the system 10 could operate for at least a temporary time until the main 12 volt power supply operation is restored.

With further reference to FIG. 2, a current divider circuit 170 is included for providing a plurality of pull-up voltages on bus lines $D_0-D_7$. The function of the pull-up voltages on these lines will be discussed in more detail in connection with the discussion of controller 38.

Further illustrated in FIG. 2 is the electrically erasable, programmable, read-only memory (EEPROM). EEPROM 112 may be used to store a variety of operational information but is preferably included to store program information for operating controller 38.

Also illustrated in FIG. 2 are the low current driver circuits 153a-153c and display 157. Driver circuits 153a-153c each include an input control line 153a', 153b' and 153c'. Since the three driver circuits 153a-153c are each identical, only the driver circuit 153a associated with control line 153a' has been illustrated in detail.

Driver circuit 153a principally comprises an inverting amplifier 172, an NPN transistor 174 and an output 176a. When control line 153a' goes to a logic 0 level, the inverting amplifier 172 generates a logic 1 level signal which turns on the NPN transistor 174. When transistor 174 turns on, the output voltage at output connector 176 drops to a logic 0 level signal. Accordingly, by controllably toggling control line 153a between a logic 0 and a logic 1 level, a digital control output can be obtained at output connector 176a. Independent digital control signals are similarly obtained at output connectors 176b and 176c of the remaining two low current driver circuits 153.

The output connectors 176a-176c are each coupled to inputs of display 157. Display 157 preferably comprises a liquid crystal display which can display a wide variety of operational parameters of a typical powershift transmission such as selected gear, engine rpm, ground speed, engine temperature and fuel level.

Figure 3:
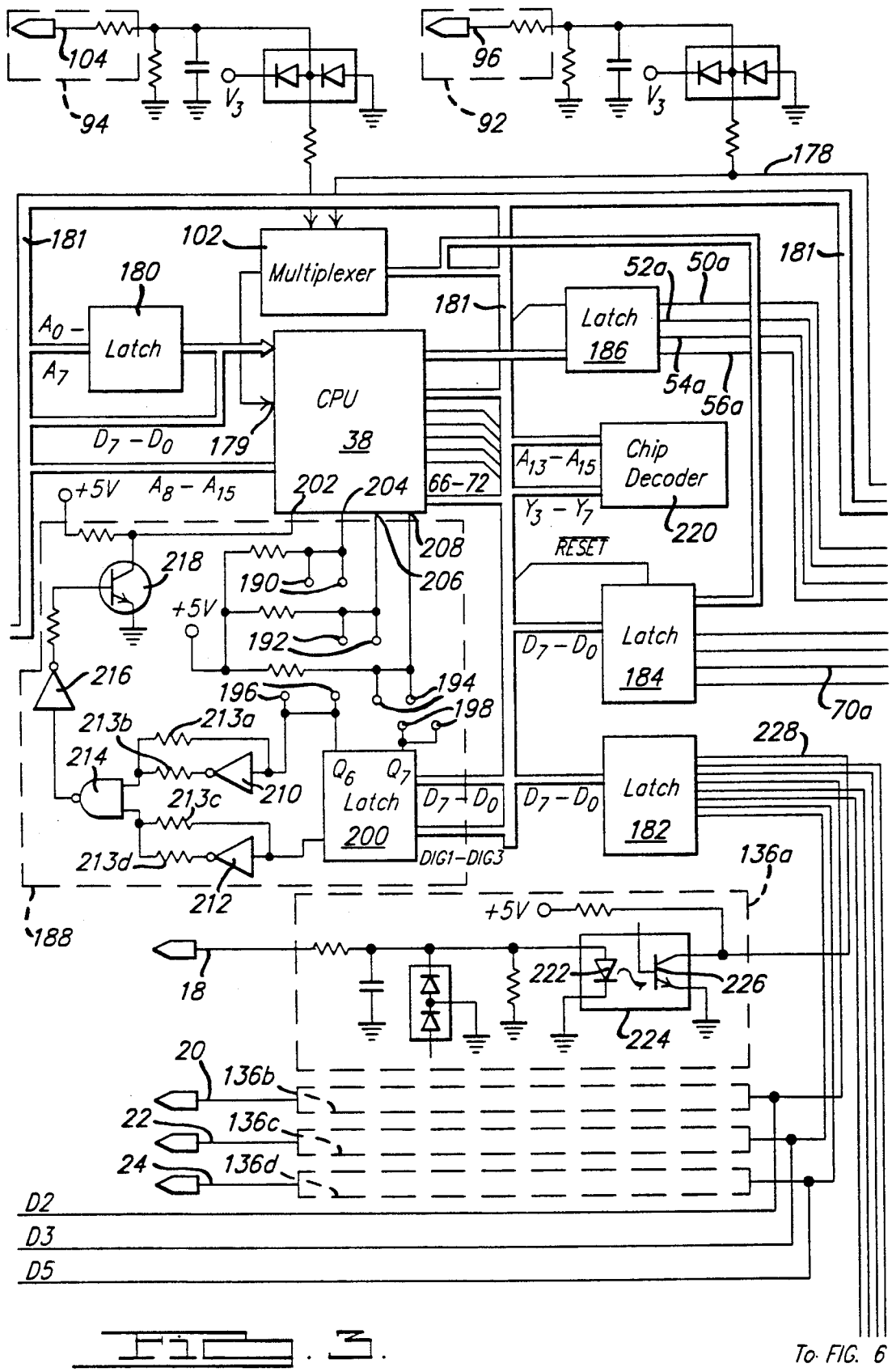

Referring to FIG. 3, the wiper arms 104 and 96 are illustrated coupled to multiplexer 102. Multiplexer 102 comprises an "8 to 1" multiplexer available from the Harris Corporation under Part No. CD74HC4051M.

The wiper arm 96 of potentiometer 92 may be operationally coupled to a sensor associated with a clutch pedal of a vehicle's powershift transmission to thereby provide a varying analog signal which is representative of the position of the clutch peddal at any given time. This signal is also coupled via line 178 with the back-up voltage supply circuit 98. The wiper arm 104 of potentiometer 94 may be operationally coupled to a sensor associated with a throttle of a vehicle to thereby provide a controllably varying analog voltage representative of the position of the throttle at any given time. The signals associated with wiper arms 96 and 104 are further output to input 179 of controller 38.

The controller 38 of the present invention comprises an 8-bit microcomputer operating at preferably 2 megahertz. The microcomputer is commercially available from the Motorola Corporation under Part No. MC68HC11E1FN. This particular controller 38 includes internal analog-to-digital (A/D) conversion circuitry in addition to internal timers at several of its outputs. Input 179 is further coupled to the internal A/D circuitry of controller 38 to enable digital signals corresponding to the analog signals from wiper arms 96 and 104. Thus, controller 38 can monitor the signals from wiper arms 96 and 104 continuously.

A plurality of independent latch circuits 180-186 are operationally coupled to the controller 38. Latch circuit 180 operates to buffer the signals output by the controller 38 on combination address/data lines 0-7 of a bus 181. Latch 182 buffers the signals from current sinking digital inputs 18-30. Latch circuit 184 buffers the outputs 66-72 from the controller 38 on bus 181 lines $D_0-D_7$, which outputs are eventually output to on/off switching devices 58-64 and to multiplexer 102. Latch 186 buffers the pulse width modulated control outputs 50-56 from controller 38 before the signals from these outputs are transmitted to switching circuits 40-46.

Further illustrated in FIG. 3 is a slave decoder/connection circuit 188 for coupling the controller 38 to the controllers of three additional, independent, external control systems and managing communication between controller 38 and the external controllers. External controllers are coupled at connection points 190, 192, 194 and points 196 and 198 of a latch circuit 200. The processor includes an active low slave select input 202, a serial clock output 204, a Master out Slave input (MOSI) 206 and a Master input Slave output (MISO) 208 which operate in connection with latch 200 and a pair of inverting operational amplifiers 210 and 212, a two input NAND-gate 214, an inverting amplifier 216 and an NPN transistor 218 to enable serial communication between controller 38 and one of the external controllers at a time. Data is trnasferred synchronously from the Master to the Slave via the MOSI digital port 206 and from ther Slave to the Master via the MISO digital port 208. The external control systems are considered Slave devices and the primary control system 10 is considered a Master device.

Depending upon the output from controller 38 on bus lines $D_0$-$D_7$, inverting operational amplifiers 210 and 212 generate output signals having either a logic 1 or a logic 0 level. When the outputs of both inverting operational amplifiers 210 and 212 represent a logic 1 level signal, the output of NAND-gate will be at a logic 0 level. Accordingly, inverting amplifier 216 will generate a logic 1 level signal at its output which turns on transistor 218 thus placing a logic 0 level signal on active low slave select input 202 of controller 38. Resistors 213a-213d are selectively included (i.e., either included or omitted) at the time of manufacture of the system 10 to tailor the logic level of the signals applied to NAND-gate 214, to thus enable controller 38, in connection with latch 200, to designate specific external control systems as specific slave devices. Once a Slave is selected, data is transferred as described above.

Further included is a 3×8 chip decoder circuit 220 which is operationally coupled to EEPROM 112. Chip decoder 220 provides additional control flexibility over the operation of EEPROM 112. It is also used to select latches 182, 184, 200 and 430.

FIG. 3 also shows four of the current sinking digital inputs 18-24, with independent buffer circuit 136a of buffer 136 shown in more detail. Since the independent buffer circuits associated with inputs 18, 20, 22 and 24 are identical with circuit 136a, only circuit 136a has been shown in detail and will now be discussed.

When a logic 1 level signal is present on current sinking digital input 18, a photo-diode 222 of an electro-optical coupler 224 forward biases a photo-transistor 226 of optical coupler 224. When photo-transistor 226 is forward biased, the +5.0 volt supply coupled to its collector is coupled to ground, thereby placing a logic 0 level signal on bus line 228. The signal on line 228 is then transmitted through latch 182 and bus line $D_7$ to the controller 38 to be read at input port 138 of the controller. The noise immunity of input 18 is enhanced by the electro-optical coupler 224 which helps to prevent transients from erroneously toggling bus line 228.

Current sinking digital inputs 18-30 may be operationally coupled to the outputs of on/off solenoids operationally associated with various physical elements of a typical powershift transmission, as exemplified by the following table:

| INPUT (reference numeral #) | PHYSICAL ELEMENT |
| --- | --- |
| 18 | "Up" gear selection mode lever |
| 20 | "Down" gear selection mode lever |
| 22 | 1st gear forward mode lever |
| 24 | 1st gear reverse mode lever |
| 26 | position at top of clutch pedal |
| 28 | parking brake |
| 30 | transmission coolant level |

Figure 4:
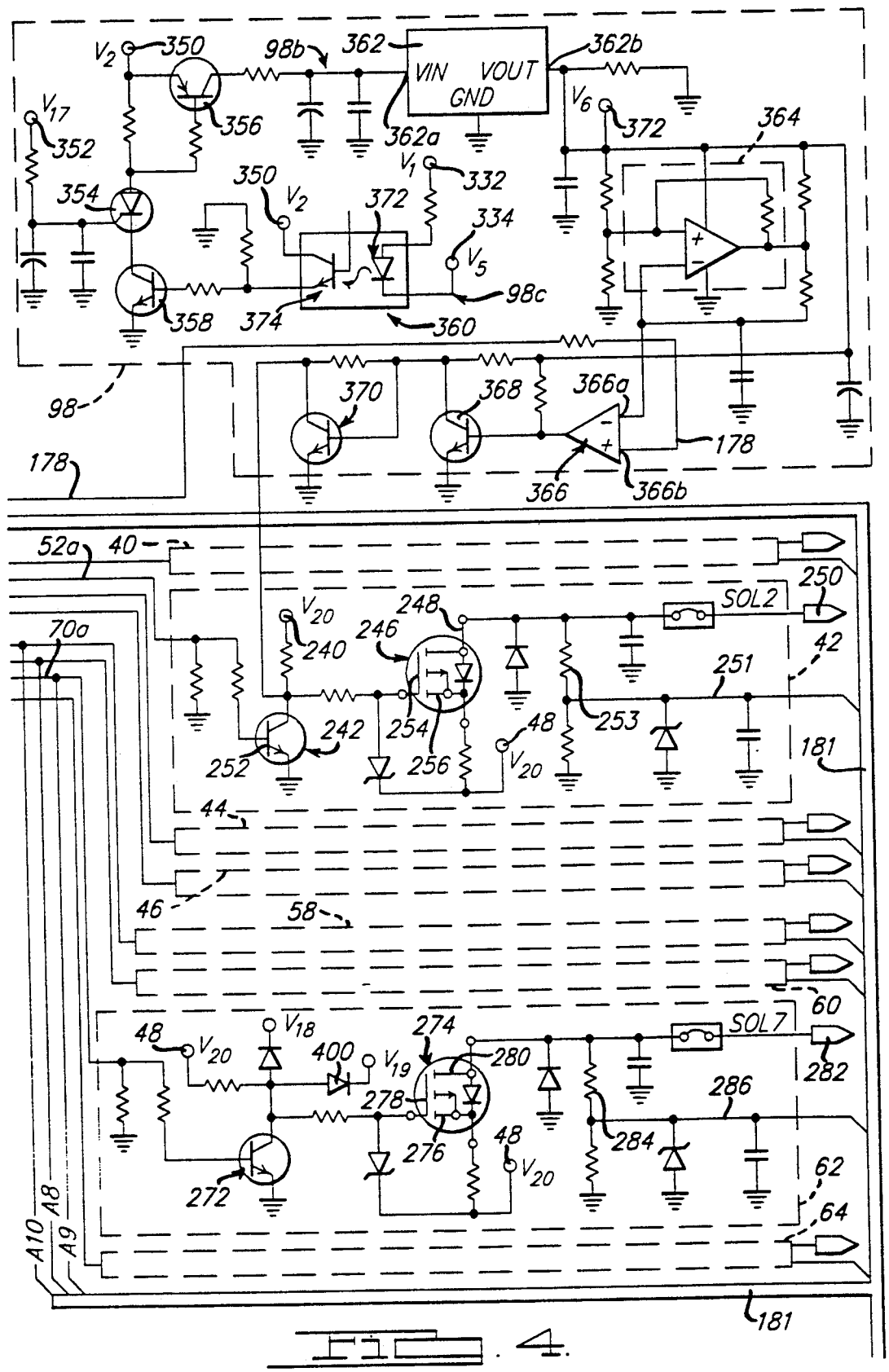

With reference to FIG. 4, the switching devices 40-46 and 58-64 are shown. In particular, switching circuit 42 and switching circuit 62 are shown in greater detail. It should be appreciated that the switching circuits 40, 44 and 46 are identical with switching circuit 42, and accordingly have not been illustrated. Similarly, switching circuits 58, 60 and 64 are identical with switching circuits 62 and likewise have not been illustrated. Accordingly, only operation of switching circuits 42 and 62 will be discussed.

Referring initially to switching circuit 42, the circuit principally comprises the +12 volt voltage source 48 ($V_{20}$), an NPN transistor 242, and a P-channel, enhancement mode, metal oxide silicone, field effect transistor (MOSFET) 246 having its drain 248 coupled to an output connector 250.

In operation, when controller 38 generates a logic 0 level signal at output port 52, the signal is transmitted through latch 186 (FIG. 3) and line 52a to the base 252 of NPN transistor 242. A logic 0 level signal turns off transistor 242, thereby coupling the gate of 246 to $V_{20}$. A logic high level signal will be applied to a gate 254 of the MOSFET 246, which holds the MOSFET 246 in an "off" condition to prevent current from voltage source 48 from flowing between a source 256 and a drain 248 of the MOSFET 246. Thus, no output signal will be present at output connector 250 while the MOSFET 246 is turned off.

When the output 52 of controller 38 is at a logic 1 level, a logic 1 level signal will be applied to the base 252 of transistor 242. The logic 1 level signal forward biases a transistor 242, thereby coupling the gate of 246 to ground. A logic low level signal is applied to the gate 254 of MOSFET 246. The logic low level signal on the gate 254 of MOSFET 246 turns on the MOSFET 246, thereby enabling current from voltage source 48 to flow between the source 256 and drain 248 to output connector 250. Thus, by placing a logic 1 level or a logic 0 level signal at its output port 52, controller 38 can controllably switch on and off MOSFET 246, and consequently the drive current from voltage source 48 being used to drive an external device such as a proportionally actuated solenoid. By further varying the duration which the MOSFET 246 is turned on, the controller 38 is able to cause the MOSFET 246 to generate a pulse-width modulated (PWM) drive signal having a duty cycle in accordance with the duty cycle of the switching control signal on line 52a.

By pulse-width modulating the output 250, the average voltage at output 250 can be closely controlled. Thus, for example, a proportionally actuated solenoid valve operationally coupled to a master clutch of a heavy-duty, off-road vehicle can be gradually, controllably enabled. The controlled enablement of the solenoid can thus be used to gradually and smoothly engage the master clutch to produce an extremely smooth, controlled shift.

The ability of the system 10 to pulse-width modulate a proportionally actuated solenoid valve operationally coupled to a master clutch of a powershift transmission greatly reduces the wear and tear on the clutch itself and wear and tear on the drive-line components of the vehicle. Thus, operator fatigue, inattention or inexperience can to a large extent be compensated for when operating a powershift transmission controlled by a control system in accordance with the present invention.

An additional feature of switching circuit 42 is the ability of the output connector 250 to be used as an input when it is not being used as an output. For example, if connector 250 was connected to the output of an external digital switch (not shown), the presence of a logic 1 level signal at the output of the external switch would be transmitted through resistor 253, where a portion of the signal would pass back through monitoring line 251.

The signal on monitoring line 251 will then be transmitted back to controller 38 via bus 181 to inform controller 38 of the status of the external digital switch. Thus, each switching circuit 40-46 and 58-64 can be used to supply an output or, alternatively, as an input, thereby greatly enhancing the flexibility of the system 10 to meet the needs and requirements of a variety of applications.

With further reference to FIG. 4, switching circuit 62 will now be described. The switching circuit 62 principally comprises voltage source 48, an NPN transistor 272, a P-channel, enhancement mode, metal oxide silicon field effect transistor (MOSFET) 274 having a source 276, a gate 278 and a drain 280; an output connector 282, a resistor 284 and a monitoring line 286.

The operation of switching circuit 62 is essentially identical to the circuit of switching device 42. An output signal from output port 70 of controller 38 (FIG. 3) is transmitted through latch 184 to circuit line 70a. The signal on line 70a is used to either forward or reverse bias NPN transistor 272, thereby placing either a logic one level or a logic 0 level signal on the gate 278 of MOSFET 274. Once a logic 0 level signal is present on gate 278, the MOSFET 274 is turned on and voltage source 48 supplies current through the MOSFET 274 to output connector 282 to provide an on/off drive signal. Output connector 282 may be coupled to the input of an on/off solenoid, to provide on/off control of the external solenoid.

The principal difference between switching circuit 42 and switching circuit 62 is that the output of switching circuit 42 is a pulse width modulated drive signal while the output of switching circuit 62 is an on/off drive signal. This difference is due to the fact that the outputs 50-56 of controller 38 are pulse-width modulated outputs capable of generating pulse width modulated control signals, while the outputs 66-72 of controller 38 are on/off outputs. It should be appreciated, however, that switching circuits 58-64 could just as readily provide pulse-width modulated drive signals if supplied with a pulse-width modulated control signal on their respective inputs.

Although a wide variety of other conventional switching devices could be employed, MOSFETs 246 and 274 are particularly desirable for their relatively high current handling capabilities. In a preferred embodiment of the invention, each of the switching circuits 40-46 and 58-64 are capable of handling up to approximately 3 amps of current each. The system 10 is further operable to supply a total of about 15 amps of current to external solenoids coupled to the outputs of switching devices 40-46 and 58-64. Accordingly, if approximately 3 amps is being output per switching circuit, then current can be supplied continuously from a maximum of any group of five of the switching circuits 40-46 and 58-62.

Figure 5:
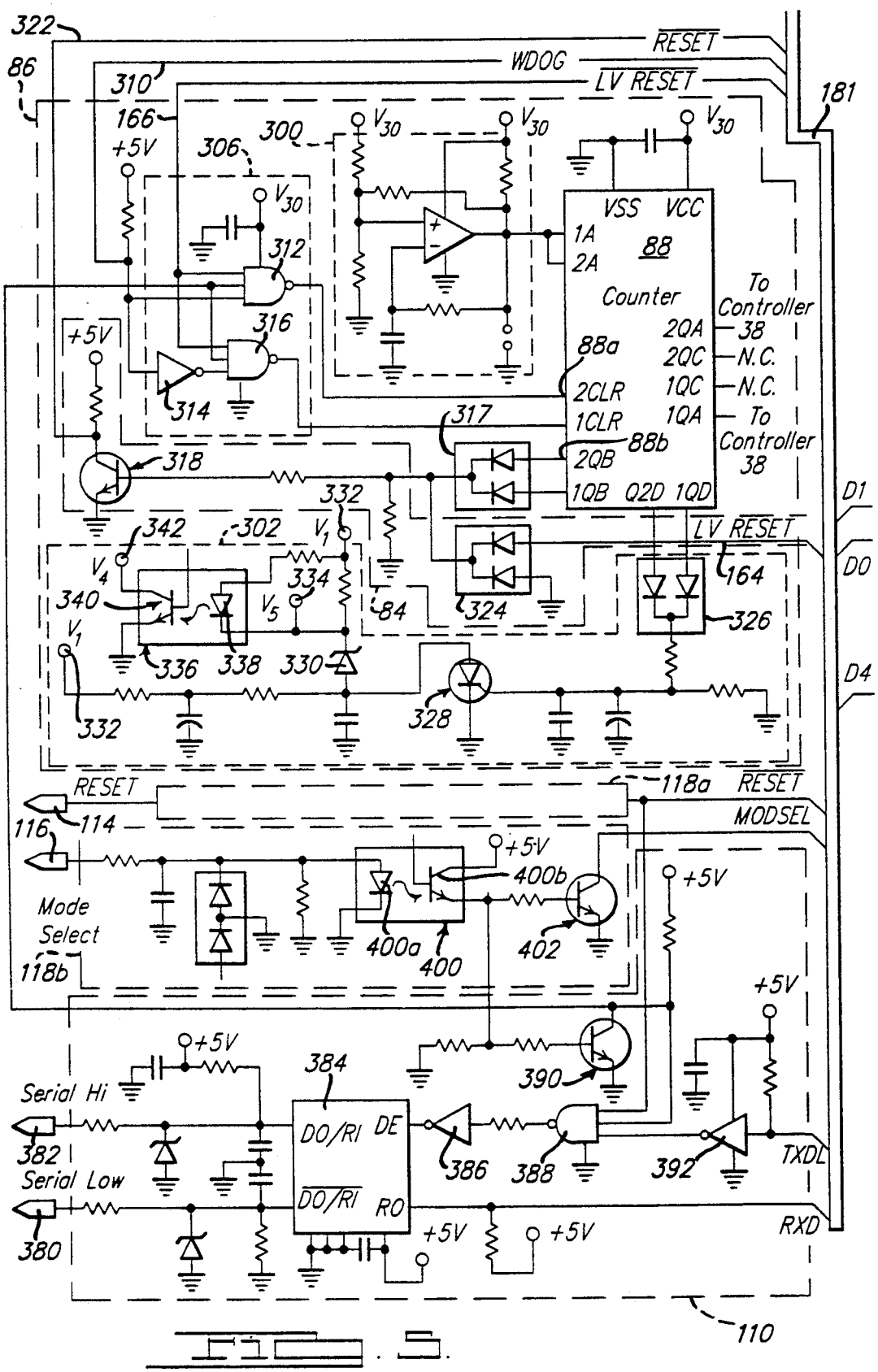

Referring now to FIGS. 4 and 5, the watchdog circuitry 86 (FIG. 5) and the backup voltage supply circuit 98 will be discussed. Since watchdog circuit 86 controls initiation of operation of backup voltage supply circuit 98, the watchdog circuit 86 will be discussed first.

The watchdog circuit 86 generally comprises the watchdog timer 88, which incorporates a dual divide by 16 counter (i.e., two timers) having clear inputs 88a (2QB) and 88b (1QB) respectively; a conventional oscillator circuit 300; backup supply voltage initiating circuit 302, low voltage reset circuit 84, and a logic circuit 306, for clearing the timers 88a and 88b of timer 88.

In operation, oscillator circuit 300 supplies a 125 Hz oscillating input signal to the 1A and 2A inputs of timer 88. The timer is commercially available from the National Semiconductor Corporation under Part No. MM74HC393M. The timers of watchdog timer 88 must be cleared approximately once every 8 milliseconds. If either timer is not cleared a reset signal is generated from its associated QB output of the timer 88. The numerical prefix of the signal designators of timer 88 distinguish between the two internal timers of watchdog timer 88. If either timer is not cleared within about 64 milliseconds, then a backup supply voltage initiating signal is generated at the 2QD and 1QD outputs of the timer 88.

In operation, the controller 38 (FIG. 3) generates a watchdog (WDOG) signal approximately every 8 milliseconds, which is transmitted via bus 181 (FIG. 3) and bus line 310 to a first NAND-gate 312 and an inverting amplifier 314. Inverting amplifier 314 generates an inverted output of the signal received on its input to a second NAND-gate 316. The outputs of NAND-gates 312 and 316 are coupled to the clear inputs 88a and 88b respectively of timer 88 and operate to periodically reset the timers of watchdog timer 88.

When the controller 38 fails to supply a watchdog (WDOG) signal on bus line 310, timer 88 generates a logic one level output pulse at either output 2QB or 1QB, or both. The logic 1 level signal forward biases one, or both, of the diodes of a dual diode pack 317, and turns on an NPN transistor 318, which couples the +5.0 volt supply voltage connected to its collector to ground. This, in turn, causes a logic 0 level signal to be applied to an active low reset ($\overline{RESET}$) input of controller 38 via reset line 322 to reset controller 38. In effect, the reset signal applied on reset line 322 acts as a "soft" reset to give the controller 38 a chance to return to normal operation before power is removed from the controller. In effect, inverting amplifiers 160 and 162 of FIG. 2 also comprise a portion of the low voltage reset circuit 84, as indicated by dashed line 84 in FIG. 2.

To further enhance the integrity of the watchdog circuit 86, low voltage reset circuit 84 is included to hold the controller 38 in a reset mode when a low voltage output is detected from voltage regulator 76 (FIG. 2), which powers controller 38. With brief reference to FIG. 2, when the output 76b of regulator 76 drops below a predetermined level, the regulator 76 generates a logic 0 level signal at output 76c. This causes a logic 1 level signal to be output on line 164 and a logic 0 level signal to be output on lines 166 as hereinbefore described. Returning to FIG. 5, when a logic 1 level signal is present on line 164, the signal is transmitted through one input of a dual diode package 324 to turn on NPN transistor 318. As long as the signal on line 164 remains at a logic one level, transistor 318 remains in an on condition, thereby shorting the +5.0 volt supply coupled to its collector 320 to ground, and thereby holding the reset circuit line 322 in an active low condition. The low voltage reset circuit line 166 ($\overline{LV-RESET}$) further operates to apply logic 0 level signals to the inputs of NAND-gates 312 and 316, thereby generating continuous logic 1 level signals at the clear inputs 88a and 88b of timer 88 to hold timer 88 in a continuously clear state. Thus, the low voltage reset signal on line 166 acts to override the control of the watchdog timer 88, thereby holding timer 88 clear while a low voltage condition exists at the output 76b of voltage regulator 76.

When the reset signal on reset line 322 fails to reset the controller 38, the timer 88 generates a logic 1 level output signal at outputs 2QD or 1QD. The logic 1 level signal is transmitted through back-up supply voltage initiating circuitry 302. The circuit 302 generally includes a dual diode pack 326; a silicon controlled rectifier (SCR) 328; a zener diode 330; a +12 volt supply voltage 332 ($V_1$); an electro-optical coupling device 336 having a photo-diode 338 and a photo-transistor 340.

In operation, the logic 1 level output signal(s) from outputs 2QD and/or 1QD of timer 88 is transmitted through one or the other of the diodes of diode pack 326 and turns on the SCR 328. The SCR 328, when turned on, couples the voltage supply 334 ($V_5$) to ground. This in turn enables current flow from voltage supply 332 ($V_1$) through the photo-diode 338 of electro-optical coupling device 336. The current flow through photo-diode 338 turns on photo-transistor 340, which couples voltage supply 342 to ground. When voltage supply 342 is coupled to ground, the 76a input of voltage regulator 76 (FIG. 2) is electrically disconnected from input voltage. Thus, the regulator 76 is turned off to insure against damage to the controller 38 and other components being powered from its output.

When voltage supply 334 of the back-up power initiating circuit 302 is shorted to ground, operation of the back-up voltage supply circuit 98 of the present invention is initiated. With reference now to FIG. 4, the back-up voltage supply circuit 98 includes a 7.0 volt supply voltage 350 ($V_2$), an input control signal 352 ($V_{17}$), a silicon controlled rectifier (SCR) 354, a PNP transistor 356, an NPN transistor 358, an electro-optical coupling device 360, a 5.0 volt regulator 362 having input 362 and output 362a, an operational amplifier 364 having positive feedback, a comparator 366, an NPN transistor 368, an NPN transistor 370, and a 5.0 v voltage supply 372 ($V_6$). The collector of transistor 370 is further coupled to the collector of NPN transistor 242 of switching circuit 42.

When voltage supply 334 is coupled to ground by a logic 1 level signal from either the 2QD or 1QD outputs (or both) of timer 88, current flows through a photo-diode 372 of electro-optical coupling device 360, which causes a photo-transistor 374 thereof to become forward biased This in turn enables voltage supply 350 ($V_2$) to forward bias transistor 358, thereby coupling the base of transistor 356 through SCR 354 (turned on by voltage supply 352) to ground. Thus, transistor 356 is forward biased and voltage supply 350 ($V_2$) supplies an input voltage of about 7.0 volts to an input 362a of voltage regulator 362, which in turn generates a back-up, regulated +5.0 volts.

The output 362b of regulator 362 is input to amplifier circuit 364 which is configured as an oscillator, which generates a triangular waveform to the inverting input 366a of comparator 366. A non-inverting input 366b of comparator 366 is coupled to circuit line 178 to thereby receive the varying analog signal read by wiper arm 96 of potentiometer 92 (FIG. 3). When the value of the signal on line 178 exceeds the reference signal on the inverting input of the comparator 366, the comparator 366 generates a logic 1 level signal which forward biases transistor 368. Transistor 370 is used to select either an increasing or decreasing duty cycle with respect to the voltage on line 178. If transistor 370 is included, a logic 1 level signal from comparator 366 will bias transistor 368 on, transistor 370 off and MOSFET 246 off. If transistor 370 is not included, a logic 1 level from comparator 366 biased transistor 368 on and MOSFET 246 on.

When the signal on line 178 is less than the reference signal on the inverting input of comparator 366, the comparator 366 generates a logic 0 level signal 70 which turns off transistor 368. This in turn forward biases transistor 370, if placed, which applies a logic 0 level signal to the gate 254 of MOSFET 246, thereby turning on the MOSFET 246. If transistor 370 is not placed, a logic 0 from comparator 366 will bias MOSFET 246 off. Accordingly, by continuously comparing the signal on line 178 with the reference signal from oscillator circuit 364, the back-up voltage supply circuit 98 is able to modulate at least one of the switching circuits 40-46 (i.e., switching device 42) in a pulse-width modulated fashion.

The ability of back-up voltage supply circuit 98 to pulse-width modulate at least one of the switching circuits 40-46 is a significant back-up feature in the event of a malfunction of controller 38. With large, heavy, off-road vehicles such as earth moving equipment, such equipment is not easily moved to a repair facility when a malfunction occurs. Thus, if the vehicle can not be moved under its own power to a repair facility, either repair efforts must be undertaken at the site of the malfunction, which may be in an environment not conducive to carrying out convenient repair, or the vehicle must be loaded on a trailer or other like carrying device to be transported to a repair facility. Neither of these alternatives are usually readily feasible.

With the control system 10 of the present invention, a "limp-home" mode is provided by which at least one pulse-width modulated driving output signal is provided to enable a master clutch of a powershift transmission of the vehicle to be moved under its own power in the event of a malfunction of the controller 38 or a malfunction of the program controlling operation of the system 10. More specifically, the system 10 of the invention provides a pulse-width modulated drive signal which pulse-width modulates a proportionally actuated solenoid valve operationally coupled to a master clutch of the vehicle. In this manner, the control system 10 is still able to provide smooth, gradual engagement of the master clutch while even in the limp-home mode, thereby further reducing the chances of erratic clutch engagement by an operator of the vehicle and premature drive-line component wear and/or failure due to abrupt engagement of the master clutch.

As should also be apparent from the foregoing discussion, the watch dog circuit 86 of the present invention is further operable to hold the controller 38 in a reset state in the event of a low voltage condition. This further helps to ensure against spurious operation of controller 38 and/or damage to it due to an unacceptably low supply voltage. The watchdog timer 88 is further powered from a separate voltage source ($V_{30}$) (FIG. 2) to further help isolate the watchdog circuit 86 from a power problem affecting the controller 38, and thereby further enhance the integrity of the operation of the watchdog circuit 86.

With further reference now to FIG. 5, the bi-directional serial communications interface circuitry 110 is shown. Also shown are buffer circuits 118a and 118b, which operate as "reset" and "mode select" inputs respectively to enable an external device to place controller 38 in a reprogramming mode.

Interface circuit 110 principally conventional fashion and comprises a pair of bi-directional communication inputs 380 and 382, an RS-485 communications interface circuit 384, an inverting amplifier 386, a three input NAND-gate 388, an NPN transistor 390, and an inverting amplifier 392. Interface circuit 110 represents an SAE J1708 serial interface for providing a 9600 baud, multiple node bi-directional serial communications link.

The interface circuit 110 of the system 10 provides a significant advantage over heretofore developed computer control systems in that it allows the system 10 to be reprogrammed in the field if needed. Accordingly, there is no need to move a vehicle associated with the control system 10 off site to modify operational parameters used by the controller 38. The system 10 can thus be quickly, easily and efficiently modified while the vehicle is still on site to compensate for varying operational or environmental conditions. The reprogramming may be effected by a portable computer having appropriate software which is brought out to the vehicle and coupled directly to bi-directional communication inputs 380 and 382.

The buffer circuits 118a and 118b associated with inputs 114 and 116 are identical in construction and operation. Accordingly, only buffer 118b will be discussed.

Buffer 118b principally comprises input 116, which acts as a "mode select" input, an electro-optical coupling device 400 having a photo-diode 400a and a photo-transistor 400b, and an NPN transistor 402. When a logic 1 level signal is received on input 116, the photo-diode 400a of electro-optical coupling device 400 is energized, thus forward biasing a photo-transistor 400b of device 400.

Referring to FIG. 6, the signal conditioning circuits 124, 126 and 128 of the current sourcing, digital frequency inputs 12, 14 and 16 respectively are shown. Since signal conditioning circuits 124, 126 and 128 are identical, only circuit 124 will be described in detail.

Signal conditioning circuit 124 generally includes a voltage supply 410 ($V_7$) of about 7.0 v. In a typical implementation of the system 10, input 12 is connected to an active speed sensor adapted to accurately measure and monitor low speed operation of a powershaft of a vehicle with which the system 10 is associated. By accurately measuring and monitoring the low speed operation of the powershaft, a continuous indication of ground speed of the vehicle can be obtained. The active speed sensor preferably comprises a variable reluctance magnetic pick-up (VRMP). Inputs 14 and 16 are preferably similarly coupled to independent, variable reluctance magnetic pick-ups or to two-wire, very low frequency, current actuated (i.e., current sourcing), variable resistance sensors, where a VRMP sensor is incorporate, signals being read and monitored should have a magnitude of preferably between about 500 mV peak-to-peak and 25 v peak-to-peak, with a frequency of preferably between about 30 Hz and 9600 Hz. Where a variable resistance sensor is employed, the signals being detected thereby should have a frequency of preferably between 1 Hz and 9600 Hz. The system 10 is capable of sourcing about 35 mA of continuous current to each of inputs 12, 14 and 16 for accurately measuring and monitoring, for example, engine rpm, transmission intermediate shaft rpm and transmission output shaft rpm.

The variable reluctance magnetic pick-up coupled to input 12, in connection with voltage supply 350, causes a varying analog signal to be applied to an inverting input 413a of a comparator 413 of a signal shaping circuit 412. The comparator 413 compares this signal with a predetermined reference input applied to its non-inverting input 413b and generates a digital signal on output line 414. The signal on line 414 represents a digital signal having a frequency indicative of operation of the powershaft of the vehicle. Accordingly, the operation of the external, variable reluctance magnetic pick-up coupled to input 12 can be monitored and converted to a related digital signal to enable the system 10 to monitor the changing speed of a driveshaft operationally coupled with the pickup. A portion of the voltage at input 12 is monitored by the analog-to-digital converter of controller 38 via voltage 410 ($V_7$). This allows for more precise measurement of low frequency signals at input 12 and sensor diagnostics.

With further reference to FIG. 6, current sourcing on/off input 34 and its associated buffer circuit 120a is shown in more detail. In a preferred implementation of the system 10, input 34 is coupled to an on/off switch, which is in turn operationally coupled to a shift lever of a powershift transmission of a vehicle. Circuit 120, in this implementation, is operable to force an operator of the vehicle to place the powershift transmission in neutral before operation of the back-up voltage supply 98 is initiated.

Circuit 120 principally comprises voltage supply 48 ($V_{20}$), an electro-optical coupling device 420 having a photo-diode 422 and a photo-transistor 424, voltage supply 350 ($V_2$), and an NPN transistor 426. While the external on/off switch connected to input 34 is in a position indicating that the powershift transmission is not in neutral, voltage supply 48 maintains photo-diode 422 in an on condition, which in turns holds transistor 424 continuously on. This in turn couples voltage supply 350 to ground. When voltage supply 350 (V2) is coupled to ground, no input voltage is supplied to the input 362a of voltage regulator 362 (FIG. 4). Thus, the voltage back-up circuit 98 supplies no output voltage.

When the external on/off switch is placed into an on position (i.e., indicating the powershift transmission has been placed in neutral), voltage supply 48 is coupled to ground, thereby turning off photo-diode 422 of electro-optical coupling device 420. The photo-transistor 424 of device 420 become reverse biased, thereby uncoupling voltage supply 350 from ground. Voltage supply 352 is similarly uncoupled from ground. Thus, voltage supply 350 (V2) may then supply an input to voltage regulator 362 (FIG. 4). Transistor 426 provides the proper voltage levels sensed by controller 38.

Transistor 426, when voltage supplies 350 and 352 are not coupled to ground, is forward biased, thus providing an interrupt signal on line 428 directly to controller 38 via the Interrupt Request Input and through latch 182 (FIG. 3). Accordingly, controller 38 is apprised when the powershift transmission is placed in neutral.

Further shown in FIG. 6 is a buffer circuit 136e of current sinking digital input 26, and a highly simplified representation of an additional current sinking digital input 26 and its respective buffer Circuit 136e. Buffer circuit 136e is shown coupled to a latch circuit 430, which is in turn coupled to bus 181. Latch 430 preferably comprises a Motorola MC74HC373DW latch circuit and is included to buffer the output of buffer circuit 136e before the output is transmitted to controller 38.

FIG. 6 also illustrates in more detail current sinking digital input 30 and its associated buffer circuit 136g. Circuit 136F is identical to 136g. With a logic 1 applied to input 30, opto-isolator 432 turns on, thereby biasing NPN transistor 434 to provide a logic 0 to $D_0$ of the data bus. If the +5.0 v signal has been removed by the watchdog circuit 86, then N-channel enhancement mode MOSFET 436 biases on providing a ground at $V_{19}$. A grounded $V_{19}$ energizes the appropriate high current output, such as output 282. Depending on the specific application, diode 438 may or may not be included.

The control system 10 of the present invention, while being particularly adapted to control a powershift transmission of a large, heavy-duty vehicle, could easily be adapted to be used with transmissions of a variety of vehicles. The various features and aspects of the system 10, however, overcome numerous significant problems associated with prior art electronic control systems for powershift transmissions.

Referring now to FIG. 7, a diagnostic program 500 used in cooperation with the system 10 when the system 10 is powered on is disclosed. Initially, the controller 38 is initialized, as indicated at 510, to clear all variable parameters associated with operation of the controller 38.

Next, a conventional diagnostic routine which may be stored in the EEPROM 112 or internal ROM of controller 38 is executed as indicated at 512. The program 500 then checks to determine if a diagnostic failure occurred, as shown at 514. If a diagnostic failure has occurred, a conventional, enhanced diagnostic failure control routine 516 is executed to effect a more thorough diagnostic check of the controller 38. If a recoverable failure exists, as indicated at block 518, a conventional, failure recovery routine 520 is executed. If the failure is not recoverable, the enhanced diagnostic failure control routine 516 is executed again, as indicated by line 522, in an attempt to rectify the failure.

Returning to block 514, if a diagnostic failure did not occur, then the program 500 reads variables associated at several of the inputs, for example, inputs 12-30, to obtain information relating to operational parameters such as engine speed, vehicle speed and the status of mode selection inputs, as all indicated at 524. A data stream representative of information being measured and monitored is then sent to display 157, as indicated at 526.

The system 10 is next caused by the program 500 to modulate the appropriate switching circuits 40-46 and 58-64, and also to monitor the solenoids coupled to circuits 40-46 and 58-64, for example, to detect for open or short circuit conditions of the solenoids, as all indicated at 528. The program 500 then checks to determine if an open or short circuit condition associated with any of the solenoids coupled to switching circuits 40-46 and 58-64 exists, as indicated at 530. If such a failure has occurred, then the enhanced diagnostic failure control routine 516 is executed, as indicated by line 532. If no failure has occurred, then a ground speed routine 534 is executed.

Referring now to FIG. 8, the steps of the ground speed routine 534 is shown in more detail. While ground speed routine 534 presently represents a preferred implementation of the control system 10 of the present invention, it will be appreciated by those skilled in the art that a wide variety of other implementations presently exist for the control system 10 to enhance the operation of powershift transmissions of various types of vehicles used in widely varying applications.

With the ground speed routine 534, the desired ground speed as selected by an operator of the vehicle is initially read, as indicated at 536. Next, the signals read are checked to see if they are within a predetermined, valid range, as indicated at 538. If the signals are not within the predetermined range, a ground speed error handling routine 540 is initiated in which an error code may be transmitted to display 157.

If the signals read are within the predetermined range, a calculation is made to determine the appropriate engine speed and transmission gear required to meet the desired ground speed selected by the operator, as indicated at 542. Next, the calculations are made to determine the required outputs to be transmitted to an external, engine controller, as well as other related information necessary for obtaining the desired ground speed, as indicated at 544.

Next, appropriate control signals are output to the external engine control module, as well as to switching circuits 40-46 and 58-64, to cause the vehicle to obtain and maintain the desired ground speed, as indicated at 546 and 548. Next, the results of the new outputs to the engine control module and to the transmission of the vehicle are observed, as indicated at 550, and any necessary modifiers for obtaining increased performance for the next update by the ground speed routine of 534 are stored, as also indicated at 550.

The component part numbers of preferred components for various elements of the system 10 are as follows:

| ELEMENT | PART NO. |
| --- | --- |
| MOSFET (246) | IRF9640 |
| Opto-couplers (all) | 1LQ2 |
| NPN Transistor | MMBTA06L |
| NPN Transistor (252) | MMBTA43L |
| NPN Transistor (174) | 2N6516 |
| Operational amplifiers | LM2903M |
| Zener diodes | MMBZ5236BL |
| SCR | 2N5062 |
| PNP | MMBTA56L |
| Voltage regulator (76) | LM2926T |
| Voltage regulator (78) | LM2931CT |
| Voltage regulator (362) | LM2931AZ - 5.0 |
| RS-485 circuit (384) | SN65176BD |

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An expandable, mobile, field reprogrammable modular microcomputer system for controlling a powershift transmission of an off-road vehicle, said system comprising:

a microcomputer for receiving a plurality of analog input signals and a plurality of digital input signals and generating in response thereto a plurality of pulse-width modulated control signals and a plurality of on/off control signals;

a first voltage regulator for supplying a regulated supply voltage to said microcomputer to thereby power said microcomputer;

a second voltage regulator for supplying current to a controller coupled to at least one of said analog or digital inputs of said microcomputer;

means for providing communication between said microcomputer and said controller;

a first plurality of switching circuits responsive to said pulse-width modulated control signals of said microcomputer and operable to generate a plurality of independent, pulse-width modulated drive signals;

a watchdog circuit for monitoring said microcomputer and resetting said microcomputer when spurious operation of said microcomputer is detected;

an independent back-up voltage supply circuit for powering at least one of said first switching circuits in the event of spurious operation of said first voltage regulator;

a bi-directional serial communications interface in communication with said microcomputer for enabling serial communication between said microcomputer and a reprogramming device such that reprogramming device can reprogram said microprogram while said off-road vehicle is at a work site; and display means responsive to said microcomputer for displaying information associated with the operation of said system.

2. The system of claim 1, wherein said bi-directional serial communications interface comprises an RS-485 bi-directional serial communications interface.

3. The apparatus of claim 1, further comprising a read-only memory associated with said microcomputer for storing program information for operating said microcomputer.

4. The system of claim 1, further comprising a low-voltage reset circuit responsive to said first voltage regulator for causing said watchdog circuit to reset said microcomputer when an output of said first voltage regulator drops below a predetermined voltage level.

5. The system of claim 1, wherein said back-up voltage supply circuit includes comparator means for comparing a fixed reference voltage with a varying control voltage from an external sensing device and generating an auxiliary pulse-width modulated control signal for pulse-width modulating at least one of said first switching circuits when said watchdog circuit has detected spurious operation of said microcomputer.

6. An expandable, mobile, field reprogrammable modular microcomputer system for controlling a powershift transmission of an off-road vehicle, said system comprising:

controller means for receiving at least one input from an external information generating device and for generating at least one pulse-width modulated output control signal and at least one on/off output control signal;

interface means coupled to said controller means for enabling bi-directional communication between said controller means and a reprogramming device such that said reprogramming device can be utilized to reprogram said controller means while said off-road vehicle is still at a work site and without removing said controller means from said off-road vehicle;

watchdog means for monitoring operation of said controller means and for generating a reset signal operable to reset said controller means when said watchdog means detects improper operation of said controller means;

means for independently powering said watchdog means;

means for monitoring said watchdog means and overriding operation of said watchdog means when said independent power means powering said watchdog means fails to supply a predetermined minimum power to said watchdog means;

at least one first switch means responsive to said pulse-width modulated control signal of said controller means for generating a pulse-width modulated drive signal; and at least one second switch means responsive to said on/off control signal of said controller means for generating an on/off drive signal.

7. The system of claim 6, further comprising back-up power supply means for providing power to one of said first and second switch means.

8. The system of claim 6, further comprising memory means associated with said controller means for storing program information to control said controller means.

9. The system of claim 6, wherein said first and second switch means each comprise a metal oxide silicone field effect transistor.

10. An expandable, mobile, field reprogrammable modular microcomputer system for controlling a powershift transmission of a heavy-duty, off-road vehicle, said system comprising:

a plurality of current sourcing digital inputs;

a plurality of current sinking analog inputs;

a plurality of current sinking digital inputs;

a microcomputer responsive to said current sourcing digital inputs, said current sinking digital inputs, and said current sourcing analog inputs for generating a first plurality of independent, pulse-width modulated control signals and a second plurality of independent, on/off control signals;

circuit means for permitting and managing communication between said microcomputer and at least one additional controller system modularly and removably interfaced to said microcomputer;

a power supply;

a first voltage regulator responsive to said power supply for generating a first regulated voltage, said first regulated voltage being operable to power said microcomputer;

a second voltage regulator responsive to said power supply for generating a second regulated voltage, said second regulated voltage being operable to supply a current to said current sourcing digital inputs;

a watchdog circuit for monitoring operation of said microcomputer and generating a reset signal for resetting said microcomputer when said watchdog detects a condition of spurious operation of said microcomputer, and for generating a back-up voltage enabling signal when a malfunction of the microcomputer is detected;

a back-up voltage regulator circuit responsive to said back-up voltage enabling signal and at least one of said analog current sinking inputs for generating an auxiliary, pulse-width modulated control signal to control at least one of said first switching circuits;

a bi-directional serial communications interface circuit for enabling said microcomputer to communicate with a reprogramming device for reprogramming said microcomputer while said off-road vehicle is at a field work site; and a multiplexer responsive to a plurality of said current sourcing analog inputs and said microcomputer for selectively coupling said plurality of current sourcing analog inputs with said microcomputer.

* * * * *

UNITED STATES PATENT AND TRADEMARK OFFICE
CERTIFICATE OF CORRECTION

PATENT NO. : 5,305,215
DATED : April 19, 1994
INVENTOR(S) : Kevin Brekkestran et al.

It is certified that error appears in the above-indentified patent and that said Letters Patent is hereby corrected as shown below:

Title page, Refs. Cited, Other Publications, add --SAE PUBLICATION No. 850,172--; and in the Abstract, line 9, replace "ingredient" with --independent--; line 27, replace "to" with --in--.

Column 2, line 40, replace "monory" with --memory--.
Column 5, line 50, replace "a" with --an--.
Column 6, line 8, delete "is".
Column 7, line 19, delete "is".
Column 8, line 17, replace "peddal" with --pedal--.
Column 8, line 65, replace "trnasferred" with --transferred--.
Column 8, line 67, replace "ther" with --the--.
Column 13, line 43, after "biased" insert --.--.
Column 15, lines 50 and 51, replace "incorporate" with --incorporated--.
Column 16, line 30, replace "turns" with --turn--.
Column 16, line 56, replace "Circuit" with --circuit--.
Column 19, line 18, Claim 1, replace "microprogram" with --microcomputer--.

Signed and Sealed this

Twentieth Day of September, 1994

Attest:

BRUCE LEHMAN

Attesting Officer

Commissioner of Patents and Trademarks